United States Patent [19]
Schott et al.

[11] Patent Number: 6,076,123
[45] Date of Patent: Jun. 13, 2000

[54] SYSTEM OF PERIPHERAL ASSEMBLIES WHICH MAY BE ARRANGED IN A DECENTRALIZED MANNER

[75] Inventors: Thomas Schott, Hausen; Siegfried Oblasser, Altdorf; Klaus Helmrich, Windsbach, all of Germany

[73] Assignee: Siemens AG, Munich, Germany

[21] Appl. No.: 09/066,394

[22] PCT Filed: Oct. 17, 1996

[86] PCT No.: PCT/DE96/01981

§ 371 Date: Jul. 28, 1998

§ 102(e) Date: Jul. 28, 1998

[87] PCT Pub. No.: WO97/16775

PCT Pub. Date: May 9, 1997

[30] Foreign Application Priority Data

Oct. 30, 1995 [DE] Germany .......................... 195 40 838

[51] Int. Cl.[7] ................................................. H05K 1/14
[52] U.S. Cl. .............................. 710/101; 710/62; 710/72; 361/633; 361/686; 361/803
[58] Field of Search ..................... 361/627–640, 361/803–804; 710/62–64, 72–74, 100–103

[56] References Cited

U.S. PATENT DOCUMENTS

| | | | |
|---|---|---|---|
| 4,744,006 | 5/1988 | Duffield | 361/686 |
| 4,764,849 | 8/1988 | Khan | 361/827 |
| 4,979,075 | 12/1990 | Murphy | 361/686 |
| 4,988,989 | 1/1991 | Goto | 340/825.21 |
| 5,420,756 | 5/1995 | Freige et al. | 361/695 |
| 5,517,623 | 5/1996 | Farrell et al. | 710/101 |
| 5,636,997 | 6/1997 | Kuroda et al. | 361/303 |
| 5,793,620 | 8/1998 | Burnworth et al. | 361/818 |
| 5,825,636 | 10/1998 | Taylor et al. | 361/990 |
| 5,949,657 | 9/1991 | Karabatsos | 361/803 |

FOREIGN PATENT DOCUMENTS

| | | |
|---|---|---|
| 0 586 715 | 3/1994 | European Pat. Off. . |
| 0 647 891 | 4/1995 | European Pat. Off. . |
| 0 678 796 | 10/1995 | European Pat. Off. . |
| 35 37 399 | 4/1986 | Germany . |
| 40 13 815 | 10/1991 | Germany . |
| WO 94/27196 | 11/1994 | WIPO . |

Primary Examiner—Christopher B. Shin
Attorney, Agent, or Firm—Kenyon & Kenyon

[57] ABSTRACT

A peripheral assembly system which can be arranged in a decentralized manner, including a basic assembly (1) and at least one expansion module. The basic assembly (1) has integrated input/output units (4, 5) of, for example, 16 or 32 bits as well as an expansion connection (7). Via the expansion connection (7), the basic assembly (1) can be expanded, in a fine-tuned manner, with expansion modules, modules having channels numbering not more than 2.

8 Claims, 2 Drawing Sheets

SYSTEM OF PERIPHERAL ASSEMBLIES WHICH MAY BE ARRANGED IN A DECENTRALIZED MANNER

FIELD OF IN THE INVENTION

The present invention relates to an assembly system which can be arranged in a decentralized manner, including a basic assembly and at least one expansion module.

RELATED TECHNOLOGY

DE 35 37 399 discloses a peripheral interface unit which can be arranged in a decentralized manner and which can be expanded with modules by means of further peripheral interface units. The peripheral interface unit contains an intelligent unit which communicates, via a first communication means, with a superordinate computer and, via a second communication means, with an expansion device, a downstream peripheral interface unit, and, via further communication means, with the technical installation. The respective peripheral interface units have means for a peripheral drive function.

WO 94/27196 discloses a decentralized peripheral assembly having a connection device into which conversion modules can be inserted. The connection to a superordinate controller is effected by a bus connection.

The design disclosed in this publication is still not optimal inasmuch as even minimal upgrading of the decentralized peripheral assembly requires a multiplicity of individual components.

Furthermore, peripheral assemblies are known in which conversion units and a bus connection are integrated in the connection device. However, the fact that these assemblies cannot be expanded constitutes their disadvantage.

SUMMARY OF THE INVENTION

Consequently, an object of the present invention consists in providing a peripheral assembly system capable of being arranged in a decentralized manner in which a cost-effective basic system is possible which also can be expanded in a flexible manner at a later date.

The peripheral assembly system of the present invention, which can be arranged in a decentralized manner, is distinguished in that the peripheral drive units of the expansion module can be removed from the peripheral assembly system independently of the peripheral connections of the expansion module, so that the peripheral drive units can be exchanged without it being necessary to disconnect the peripheral connections beforehand and connect them again later. So-called permanent wiring is therefore achieved. In addition, the peripheral assembly system of the present invention is distinguished in that very simply designed peripheral drive units may be placed in it, which can be inserted, without alterations, into any desired plug-in locations of the expansion device, without requiring any alterations in the expansion module or the peripheral drive units.

BRIEF DESCRIPTION OF THE DRAWINGS

Further advantages and details emerge from the following description of an exemplary embodiment of the present invention, with reference to the Figures in which.

DETAILED DESCRIPTION

Figure 1:
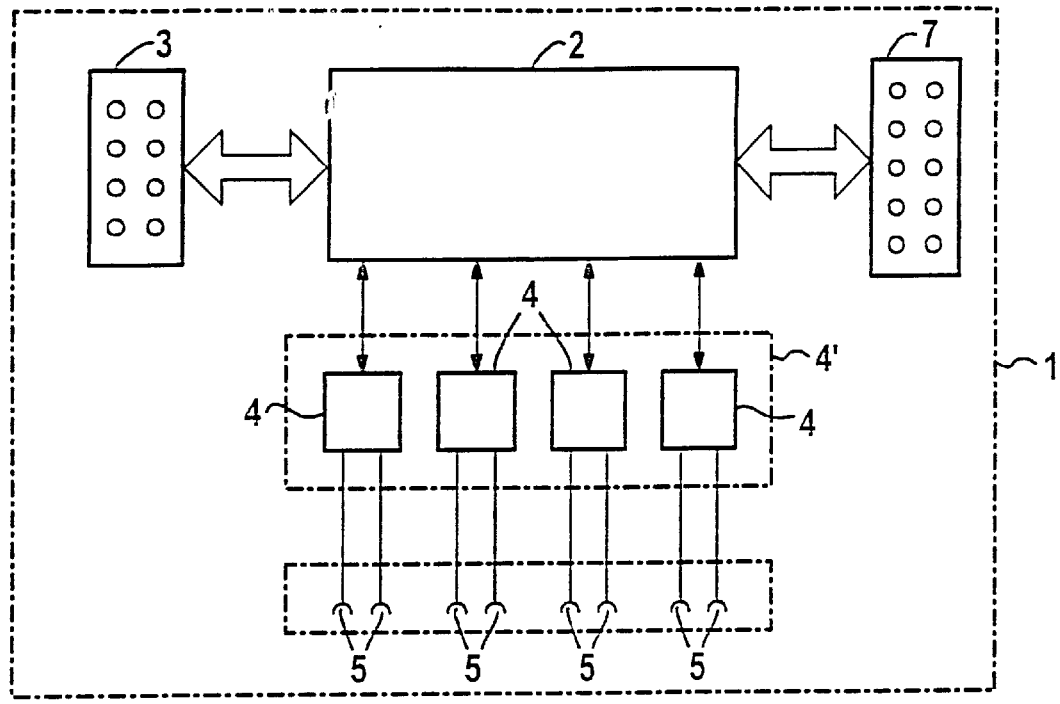
FIG. 1 shows a block diagram of an embodiment of the basic assembly of the present invention.

As illustrated FIG. 1, basic assembly 1 includes an intelligent unit 2. Unit 2 maybe, for example, a microcontroller. Intelligent unit 2 is connected to a field bus connection 3 for communicating with a superordinate controller. The intelligent unit can communicate with a superordinate programmable controller via field bus connection 3, for example, in accordance with the PROFIBUS protocol. As a result, intelligent unit 2 can receive data from the programmable controller or, conversely, can transmit data to said controller.

Intelligent unit 2 is also connected to peripheral drive units 4. Peripheral connections 5 are in turn connected by means of peripheral drive units 4, so that, as a result, intelligent unit 2 can receive signals from a technical installation to be controlled, or can output signals to said installation. Therefore, intelligent unit 2 can communicate also with the technical installation via peripheral drive units 4 and peripheral connections 5.

For reasons of clarity, peripheral drive units 4 in FIG. 1 are shown as two-channel peripheral drive unit groups. In actual fact, however, the peripheral drive unit groups can attend to four or eight channels. This results in 16 or 32 peripheral connections for the basic assembly.

Instead of peripheral drive units 4 being divided into four groups, they could also be combined to form one single peripheral drive unit 4'. However, the concept of the "number of peripheral drive units" is to be understood as meaning the sum of all the channels.

When basic assembly 1 is connected to a superordinate programmable controller via field bus connection 3, it is capable of operation on its own. However, if peripheral drive units 4 and peripheral connections 5 do not suffice for controlling the technical installation to be controlled, it is necessary to connect basic assembly 1 and expansion module 6 to one another via expansion connections 7, 7', which correspond to one another 1:1. The connection can be effected, for example, by a prefabricated ribbon cable.

Figure 2:
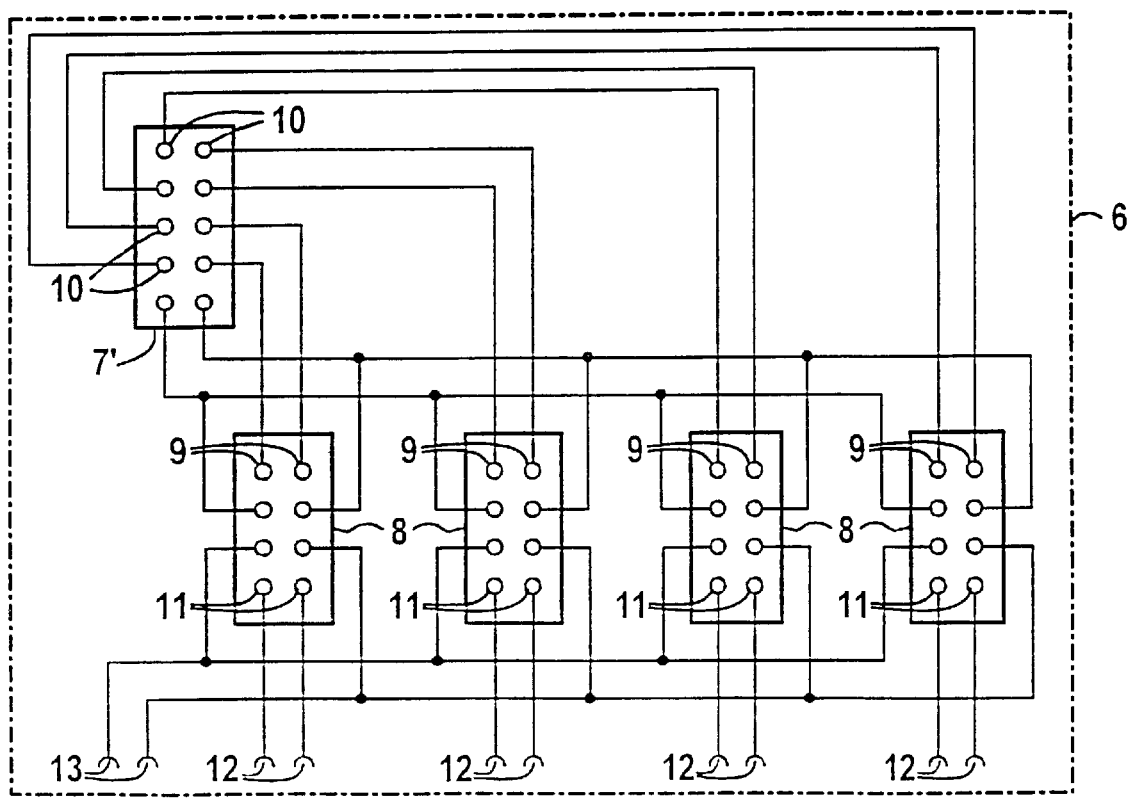
FIG. 2 shows a block diagram of an embodiment of the expansion, module of the present invention.

Expansion module 6 has a plurality of plug-in locations 8 as shown in FIG. 2. Two top contacts 9 of each plug-in location 8 are connected to two contacts 10 of expansion connection 7'. The useful signals are transmitted via these contacts. Furthermore, two bottom contacts 11 of plug-in locations 8 are connected to peripheral connection units 12. The other four contacts of each plug-in location 8 are either connected internally to ground or +5 volts, via expansion connection 7', or they can be connected externally to 0 and +24 volts, via terminals 13.

As is evident from FIG. 2, peripheral connections 12 of a plurality of expansion modules are thus arranged on expansion module 6.

As is evident from FIG. 2, the plug-in locations 8 are therefore configured having two channels. However, they could also be configured having a single channel. Moreover, only four plug-in locations 8 are illustrated in FIG. 2. As embodied herein, however, expansion, module 6 has eight plug-in locations.

Peripheral drive units 14 (FIG. 3) of expansion modules 6 are inserted into plug-in locations 8. It is evident from FIG. 2 that peripheral drive units 4 can be inserted into each plug-in location 8, since the arrangement of plug-in contacts 9 and 11 is identical in all plug-in locations 8. Moreover, it is evident that the peripheral drive units which are inserted into expansion unit 6 can be removed from the peripheral assembly system of the invention independently of peripheral connections 12.

Figure 3:
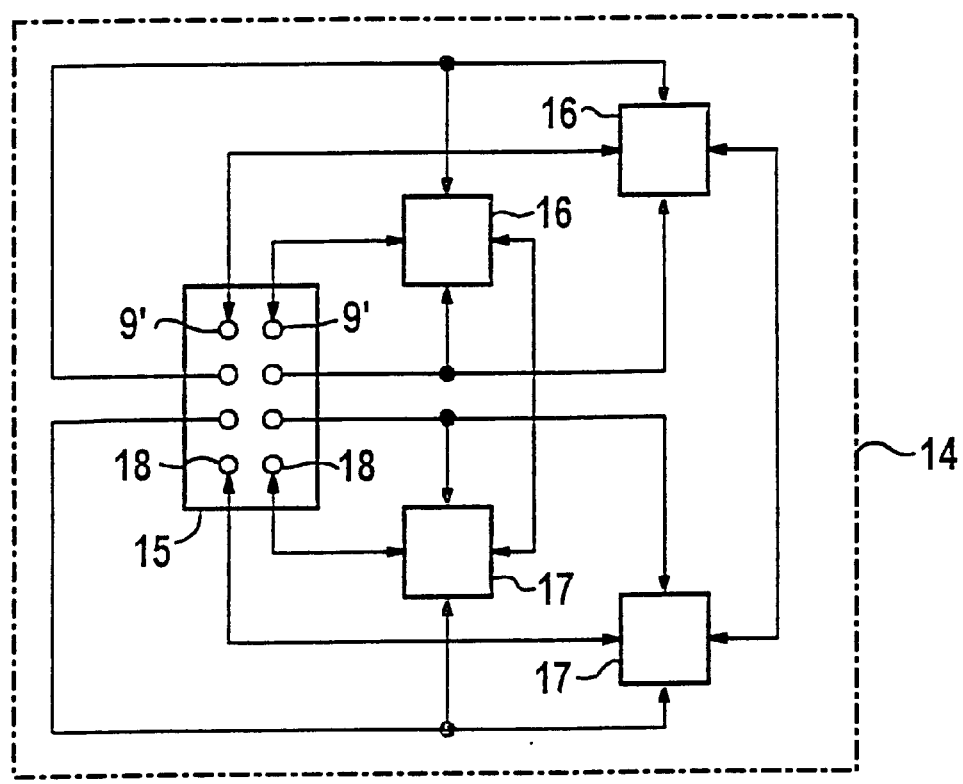
FIG. 3 shows a block diagram of an embodiment of a peripheral drive unit of an expansion module of the present invention.

Referring now to FIG. 3, as embodied herein peripheral drive unit 14 is an analog input/output module 14. As illustrated in FIG. 3, module 14 has a plug-in connector 15 by which it can be inserted into one of plug-in locations 8. Two signal contacts 9' are connected to conversion units 16, which are in turn connected to level converters 17. Level converters 17 are connected to two input/output contacts 18.

Intelligent unit 2 of basic assembly 1 is designed in such a way that it can transmit a serial bit pattern via any one of expansion contacts 10, with the exception of the two supply contacts. For this purpose, it functions a conversion unit which converts an analog signal, which is to be transmitted to the technical installation to be controlled, into a bit pattern. This bit pattern is then transmitted serially via the corresponding line to module 14, and from there on to one of conversion units 16. Conversion unit 16 uses the received serial bit pattern to determine the corresponding analog output signal and transmits it to level converter 17 connected to it. Level converter 17 then outputs the signal via assigned input/output contact 18 to the technical installation to be controlled.

If, conversely, peripheral drive unit 14 is an analog input module, level conversion of the signal received via input/output contact 18 is first, effected in level converter 17. The converted signal is then converted into a bit pattern by conversion unit 16, said bit pattern being in turn transmitted serially via one of signal contacts 9' to intelligent unit 2 of basic assembly. The latter then reconstructs the corresponding analog signal from the received serial bit pattern.

The method for analog signal transmission, in particular, is very interference-proof due to the digitization of the transmitted signals.

What is claimed is:

1. A peripheral assembly system which can be arranged in a decentralized manner, the peripheral assembly system comprising a basic assembly and at least one expansion module;

the basic assembly including:
an intelligent unit,
an expansion connection for expanding the basic assembly, the expansion connection connecting the intelligent unit to the at least one expansion module, the expansion connection having a dedicated expansion contact for each useful signal to be transmitted between the basic assembly and the at least one expansion module,
a bus connection connected to the intelligent unit, the bus connection for communicating with a superordinate controller,
at least one first peripheral drive unit connected to the intelligent unit, and
at least one first peripheral connection associated with the at least one first peripheral drive unit for communicating, together with the at least one first peripheral drive unit, with a technical installation to be controlled;

the at least one expansion module including:
at least one second peripheral drive unit, the number of the at least one second peripheral drive unit being considerably fewer than the number of the at least one first peripheral drive unit,
at least one second peripheral connection associated with the at least one second peripheral drive unit, and
at least one plug-in location, each of the at least one plug-in location for receiving a respective one of the at least one second peripheral drive unit, and each of the at least one plug-in location having a dedicated plug contact for each useful signal to be transmitted between the basic assembly and the respective one of the at least one second peripheral drive unit, each of the at least one dedicated plug contact which is provided for the transmission of useful signals being connected and assigned to the dedicated expansion contact which is provided for the transmission of useful signals, each of the at least one plug contact being arranged in the same position at each of the at least one plug-in location,
the at least one second peripheral drive unit being removable from the peripheral assembly system independently of the at least one second peripheral connection.

2. The peripheral assembly system as recited in claim 1 wherein the bus connection is a field bus connection.

3. The peripheral assembly system as recited in claim 1 wherein the number of the at least one plug-in location of the at least one expansion module is between 5 and 10.

4. The peripheral assembly system as recited in claim 3 wherein the number of the at least one plug-in location of the at least one expansion module is 8.

5. The peripheral assembly system as recited in claim 1 wherein at least one of the at least one second peripheral drive unit is configured as an analog input module,
the analog input module having a conversion unit for converting an analog signal received from the technical installation to be controlled into a serial bit pattern to be transmitted to the basic assembly via the expansion connection, and
the intelligent unit being adapted to determine the analog signal corresponding to the received serial bit pattern.

6. The peripheral assembly system as recited in claim 1 wherein at least one of the at least one second peripheral drive unit is configured as an analog output module,
the intelligent unit having a conversion unit for converting an analog signal to be transmitted to the technical installation to be controlled into a serial bit pattern to be transmitted to the analog output module via the expansion connection, and
the analog output module being adapted to determine the analog signal corresponding to the received serial bit pattern.

7. The peripheral assembly system as recited in claim 1 wherein the number of the at least one first peripheral drive unit, together with the associated first peripheral connection, is 16 or 32.

8. The peripheral assembly system as recited in claim 1 wherein the number of the at least one second peripheral drive unit, together with the associated second peripheral connection, is 1 or 2.

* * * * *